United States Patent

[11] 3,595,503

| [72] | Inventor | Robert Tidblad, deceased<br>late of Vallingby, Sweden (by Kristina<br>Tidblad, legal representative) |
|---|---|---|
| [21] | Appl. No. | 810,087 |
| [22] | Filed | Mar. 21, 1969 |
| [45] | Patented | July 27, 1971 |
| [73] | Assignee | LKB-Produkter AB<br>Bromma, Sweden |
| [32] | Priority | Mar. 22, 1968 |
| [33] | | Sweden |
| [31] | | 3813/68 |

[54] VIBRATION-ISOLATED SYSTEM
7 Claims, 4 Drawing Figs.
[52] U.S. Cl. ...................................................... 248/21,
108/136, 248/358, 248/399, 267/166
[51] Int. Cl. ...................................................... F16f 15/00
[50] Field of Search ........................................... 248/20, 21,
22, 23, 358, 350, 370, 399, 400; 108/136;
269/166, 1

[56] References Cited
UNITED STATES PATENTS

| 2,711,297 | 6/1955 | Thiele | 248/358 X |
| 3,428,185 | 2/1969 | Vorndran | 108/136 X |

FOREIGN PATENTS

| 86,689 | 10/1955 | Norway | 108/136 |

Primary Examiner—J. Franklin Foss
Assistant Examiner—J. Franklin Foss
Attorney—Christen & Sabol ABSTRACT: A system is isolated from disturbances having low amplitude, the isolation consisting of a number of oblique resilient elements and a number of damping elements functionally coupled in parallel with the oblique resilient elements. Both the oblique resilient and the damping elements are connected with an isolating part in an outer frame. The damping elements have no supporting function and act nonlinearly. This system is useful for sensitive instruments and tools, as ultramicrotomes.

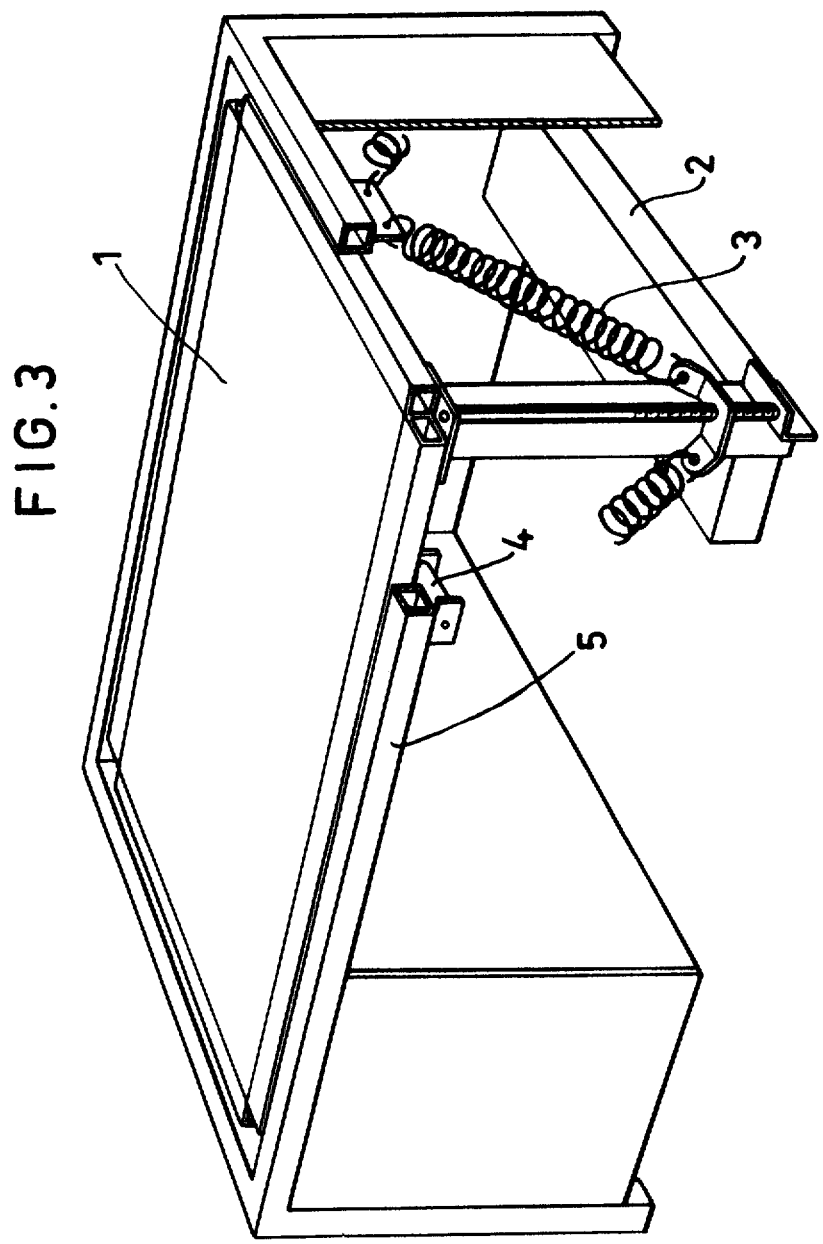

VIBRATION-ISOLATED SYSTEM

BACKGROUND OF THE INVENTION

The present invention relates to a vibration-isolated system, especially a system suitable for sensitive instruments and tools such as ultramicrotomes. With the system vibration isolation is achieved also of disturbances with low amplitude. The resonance frequency of the system is low.

Vibration isolation of sensitive instruments is an old problem, which as a rule has been solved by placing the instrument, possibly together with a bigger mass, for instance a stone, on a number of vibration-isolating elements. This instrument orientation of the problem solution is due to very different vibration sensitivity of different instruments and to varying level of disturbance in different rooms. It has thus been supposed before that a certain instrument should be placed in a certain room and, starting from known data, a number of vibration isolating, i.e. resilient, elements, have been provided.

The innovation activity so far existing in the field of vibration isolation has been quite directed to the separate resilient elements in order to make these elements more soft and laterally more stiff, and to give them bigger loading capacity and interior losses etc.

This trend depends on the fact that the vibration isolation can be described mathematically exactly in an ideal case rather well corresponding to the practical case. The deviations from the ideal case are maximum at low disturbance levels.

At conventional vibration isolation the system at sufficient isolation can be so softly adapted and unsteadily that work with instruments or tools is made impossible.

The need for solving the isolation problems is very great and has been brought to life, i.a. by the progress of the ultramicrotomy. The application possibilities of this important preparation technique of the electron microscopy might increase considerably. As the conventional method with separate vibration isolating elements is not usable, a system solution must be considered, for instance in the shape of a table.

At present only two types of vibration isolating tables are being marketed. With one of the tables (Serva-Bench, Barry Controls) conventional vibration isolating elements are used. These elements function by means of air resilience and automatic level setting. Also the other table (LKB-Produkter 4806 A) is conventionally built. The latter table solves some vibration problems in microtomy, but several unsolved problems remain.

According to the general theory for vibration isolation the following applies at an ideal case:

A mass M (kg.) on a resilient substratum with the spring constant $k$ (N/m.) (N =Newton) and the damping factor $c$ (N-sec./m.) is actuated by a vibration of the substratum with the amplitude A (m./sec.) and the frequency $f$ (Hz.). The vibration is transmitted to the mass M with a vibration amplitude T·A, where T is the transmitting function dependent on the frequency. The amplitude A can be expressed as acceleration, speed or length magnitude. With respect to the problem to be solved it is here suitable to use the acceleration of the disturbing environment. If following conceptions the resonance frequency $$f_0 = \frac{1}{2\pi}\sqrt{\frac{k}{M}}$$

the relative frequency $n=f/f_0$ and the damping relative to critical damping $$D = \frac{c}{2\sqrt{kM}} \text{ are introduced,}$$

$$T^2 = \frac{1+4D^2n^2}{(1-n^2)^2+4D^2n^2}$$

is obtained after elementary calculation.

The vibration isolation I expressed in decibel is obtained as $$I = -20^{10}\log T = 10^{10}\log\left[\frac{(1-n^2)^2+4D^2n^2}{1+4D^2n^2}\right]$$

In FIG. 1 I is set in the form of a diagram as function of $n$ at different damping relative to critical damping D.

It appears from the diagram that the vibration isolation is improved with increasing values of $n$, i.e. for a certain disturbance frequency $f$ the vibration isolation I increases, if the resonance frequency $f_0$ of the system is reduced as much as possible. The disturbance frequencies concerned are assumed to be above the resonance frequency. With increasing damping D, i.e. increasing interior losses in the resilient substratum, the vibration isolation I is reduced for frequencies $f$ which are bigger than $\sqrt{2}$ times the resonance frequency $f_0$. The peak of the resonance frequency itself meaning an amplification of the disturbances coming from outside are however reduced with increasing damping. In order to achieve increased vibration isolation the resonance frequency and damping should thus be reduced, but this provides such flexibility in the suspension that the swaying may risk the function of the isolated instrument. As it is impossible to avoid disturbances in practice, which excite resonance vibrations, the damping is not considerably reduced.

The calculations apply with good approximation for big vibrations in stiff system, for instance machine tools. At small vibration amplitudes seen as absolute a marked influence is obtained from so-called structure resonances. The vibration isolation is impaired for frequencies agreeing with the resonance frequencies of parts of the complete system, which are never quite stiff or without mass. The most important deviation of this kind is due to the fact that a resilient element has its own masses, and therefore spring resonances are obtained in the system. See curve $a$ in the diagram according to FIG. 2. In order to attain vibration isolation for all frequencies within a broad range the situation may be improved by increasing damping. See curve $b$, FIG. 2.

The above way of looking at things has only one dimension and presupposes that oscillations in different directions can be treated independently of each other. If the instrument concerned is vertically sensitive, it should thus be sufficient with vibration isolation vertically. However in practice coupling is obtained between different modes. This so-called mode coupling may be in the instrument, and therefore it may be very difficult to eliminate. It will be too complicated theoretically as well as practically. The vibration isolation must instead be made the same for disturbances in different directions. For a definite, suspended mass the spring should thus be the same in different directions.

The systems as above have been assumed to be linear, i.e. the spring constant has been supposed to be constant and not varying with the load. At nonlinear systems the ground for the theoretical treatment disappears and new methods of treatment must be used. A disturbance of a certain frequency does not give as a result an oscillation of the same frequency. The conception transfer frequency must be abandoned. At small deviations from linearity the transfer function is however used, as it can say practically something about the vibration isolation. A disturbance of a certain frequency will cause overtone oscillations, i.e. oscillations of the double, treble frequency etc. At sufficiently small disturbance amplitudes, the linear model can be used and the conception transfer function will have a meaning.

SUMMARY OF THE INVENTION

It is the object of the present invention to solve in a great number of cases the vibration problem for sensitive instruments and tools. It is especially intended to achieve a vibration-isolated system suitable for ultramicrotomes. This is achieved by the component elements of the system consisting of resilient elements known in principle per se. The system is built from a number of oblique springs, which carry the isolated unit, and from a number of dampers functionally coupled in parallel with the oblique springs, said dampers having no carrying function and being nonlinearly acting so that they become more stiff at deviations from the rest position of the system.

The function of the vibration isolated system according to the invention agrees with that generally in use, i.e. a heavy mass carried by resilient elements. As these elements have been adapted obliquely, the spring constants can laterally be given the desired values by variation of the inclination of the springs. The springs that are unloaded in the rest position act however on the total resilience of the system and must be considered at calculation of the resonance frequencies. This also applies to small oscillations, i.e. outer disturbances. In operation with the isolated instrument this must not be too softly adapted for the sake of making work easier. In the invention this is eliminated by the nonlinear dampers, which stop all movements in excess of the working field of the dampers. The own damping of the system may furthermore be varied by variation of the damping of these elements. The elements connected in parallel are unloaded in the rest position, and therefore the choice of material can be made practically freely.

Dimensioning of the elements is simple. For an oblique spring with the spring constant $k$ and with the inclination $v$ against the ground plane $k_r = k \sin^2 v$ and $k_N = k \cos^2 v$ respectively are obtained. By changing the inclination of the spring the relation between the spring constants may be changed within wide limits. The spring constant can for instance be made small vertically so that good isolation is obtained against the most usual type of oscillations of a floor, i.e. oscillations vertically.

With the system of the present invention disturbances of a low frequency can be isolated without too large an unsteadiness being obtained. The system is well suited for vibration isolation of instruments and tools, which would otherwise be disturbed by the normal, mostly low-frequent vibrations of the floor.

BRIEF DESCRIPTION OF THE DRAWINGS

In the attached drawings FIG. 3 is a schematical perspective view of a vibration isolated table and FIG. 4 is a diagram of the vibration isolation at different frequencies. The microtome table is merely mentioned as a probable embodiment of several embodiments, and the example must not be considered as limiting for the invention.

Figure 1:
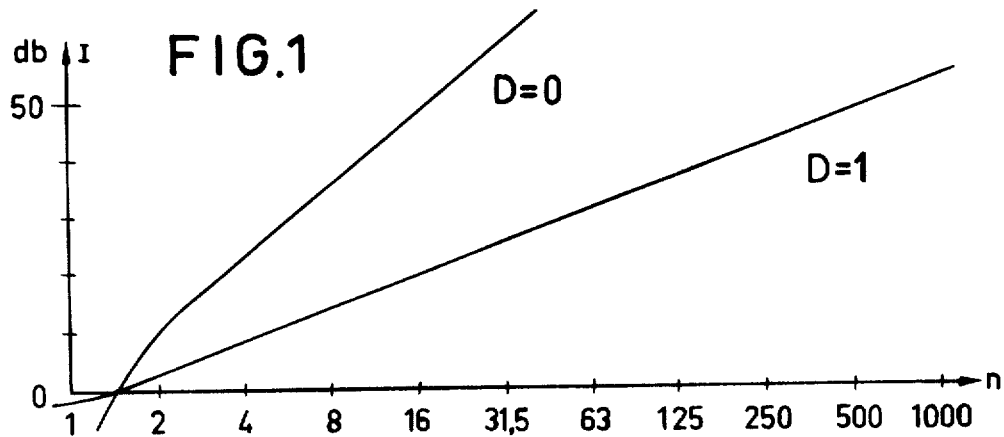
FIG. 1 and FIG. 2 illustrate the vibration isolation as function of the critical damping and the vibration isolation taking account of the inherent masses of the spring elements, respectively, as explained above. The invention will be described below with reference to FIGS. 3 and 4.
Figure 2:
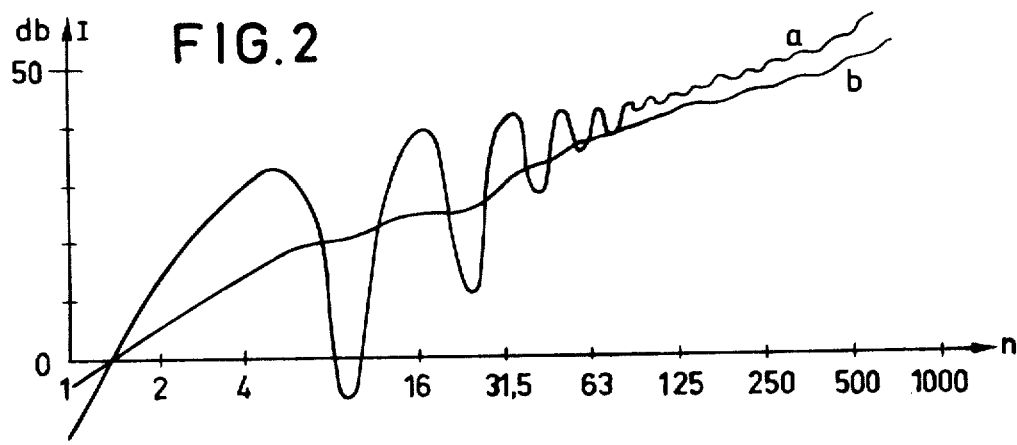

The sensitivity of an instrument of this kind is best understood, if it is considered that the variations in slice thickness must not exceed values of about 10 A. (Angstrom units). The absolute sensitivity of the microtome and its own interior damping make it suitable to express the demand on a vibration free environment by indicating maximally permitted acceleration of the substratum. A theoretical evaluation starting from the construction of the microtome shows that an acceleration of maximum 0.1 m./sec.$^2$ can be permitted. This value has in practice appeared to be correct.

At construction of a table fulfilling the above acceleration conditions the factors must be considered, which are not included in elementary theoretical treatment, i.e. inherent resonances of details in the construction, preferably in steel springs, nonlinearities in vibration transfer, connections between oscillation modes, principally basic oscillations vertically and laterally. By choosing the resonance frequency equal vertically and laterally the vibration isolation will be the same. The problem of mode connection will in this way be uncritical.

The isolation unit consists of a table top 1 provided with a ballast, on which the microtome is placed. The carrying elements comprise eight steel springs 3 adapted according to FIG. 3. Vertically all springs 3 are carrying, but in a certain lateral direction only four are active. If the table should have the same resonance frequency vertically as laterally, the total spring constants should be similar, i.e.

$8 k \sin^2 v = 4 k \cos^2 v$ where $k$ is the spring constant of the separate spring. The above will result in $v = 35°$.

In order to reduce the breakthrough of the inherent resonance of the springs these may be wrapped up in foamed plastic or other suitable material. As nonlinear resilient elements rubber dampers 4 of standard type are used. By these elements being unloaded it will be possible to ignore the creep properties of the rubber. In the linear range with small disturbing vibrations the rubber dampers 4 cause an increased stiffness of the construction and an increase of the resonance frequency of the system. If the rubber dampers 4 have the same total spring constant as the steel springs 3 the resonance frequency increases with a factor $\sqrt{2}$.

The disturbances to be shielded consist normally of house vibrations. These comprise in frequency an interval from some Hz. to about some hundred Hz. To achieve essential isolation in this range the resonance frequency of the system should amount to maximum some Hz. As a technically suitable value 2 Hz. has been chosen. The measuring tool used when studying the vibration isolating properties of the table has been an accelerometer of the make Bruel and Kjaer, type 4332 with amplifier of the type 2203a of the same manufacture. On account of limitations of the instrument it has only been possible to measure down to an acceleration of about 0.3 mm./sec.$^2$ within a frequency interval of 5—700 Hz. This has been sufficient, as it has been possible to measure the isolation properties of the table at higher levels of disturbance than what is us practice. The errors in the measuring results caused by this have been considered as negligible, the increase of the disturbance level being moderate. Measuring has been performed by having a weight falling down to the floor in a way that can be reproduced. The maximum acceleration value of the thud has been read with the accelerometer on the floor and on the tabletop. By using a variable band filter in measuring electronics it has been possible to obtain an idea of the frequency dependence of the vibration isolation. This method can advantageously be used at comparison of different constructions in otherwise similar conditions.

In order to indicate the vibration-isolating properties a filter has been used, letting through the disturbance frequencies concerned (about 5—350 Hz.) and the mean value of the isolation in this interval has been calculated.

Figure 4:
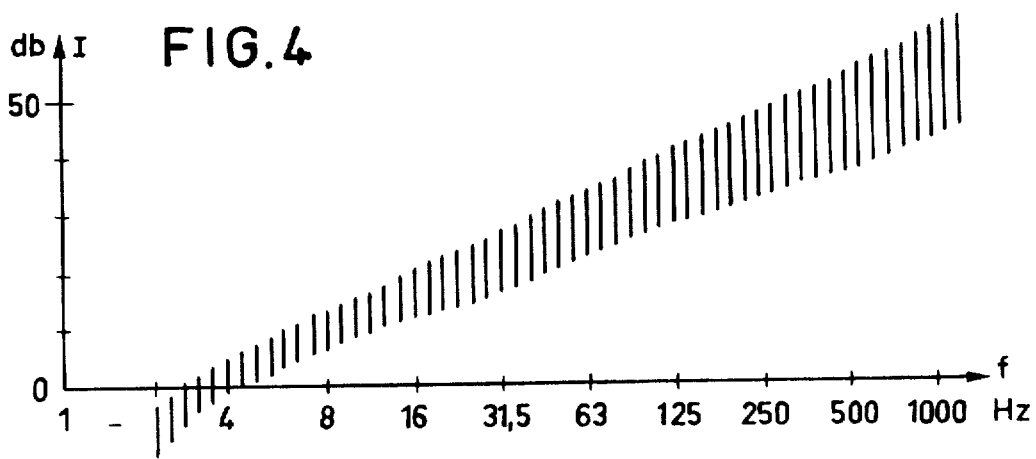

The isolation value will certainly be dependent of the composition of the disturbance, but this will be compensated by the total effect of the vibration isolation being determined in an environment which is not too unusual, i.e. in a laboratory room in a big house with several activities. In such measuring a vibration isolation of about 15 db. was obtained. In comparison with this value and the vibration isolation of the system evaluated according to theory (as in the diagram in FIG. 4) it is found that the disturbance concerned must have been of a low-frequent nature. This additionally stresses the necessity of having a low resonance frequency of the system.

In order to further study the vibration isolating properties of the table a test cutting has been made by means of an ultramicrotome. In spite of the fact that a number of machine tools were operating in the vicinity, cuts could be made without it being possible to notice any defects. The results of this test cutting surpassed all expectations.

Modifications of the vibration-isolated system within the scope of the invention may of course occur. The oblique springs need not consist of steel, but also other suitable spring material may be used. The inherent resonances of the springs need of course not be reduced just with plastic foam as mentioned above. Furthermore the dampers connected in parallel may consist of other materials than rubber, of course with the demand that the dampers should act nonlinearly and reduce great oscillation amplitudes of the table. The dampers are usually designed so that the stiffness becomes equal in different directions. Damping may be varied within wide limits.

In the embodiment eight similar steel springs have been used. This need not be the case. Of course more or fewer springs may be used, and these springs need not be similar. What is essential is that the spring constant by its inclination may be varied to desired values vertically and laterally and that the total spring constant in a certain direction will be the desired one.

What I claim is:

1. Vibration isolation system for suspension of sensitive instruments to isolate low-amplitude vibrations comprising a framework, support means for an instrument to be isolated, a plurality of longitudinally resilient load-carrying members connected between said framework and said support means and extending longitudinally angularly with respect to a vertical line, and a plurality of nonload-bearing damping elements having no linear response characteristics connected between said framework and said support means and arranged to exert damping forces in directions parallel with the effective forces exerted by said load carrying members.

2. The vibration isolation system of claim 1, wherein the oblique resilient elements consist of oblique steel springs.

3. The vibration isolation system of claim 2, wherein the damping elements consist of a nonlinearly acting rubber damper with about the same stiffness in different directions.

4. The vibration isolation system of claim 3 comprising an isolated rectangular table attached in an outer frame by means of eight oblique steel springs arranged in coupled in the corners of table top and including four rubber dampers arranged in couples alongside the table top without a load-carrying function and acting nonlinearly.

5. The vibration isolation system of claim 4, wherein the inclination of the springs is such that the spring constants are similar vertically and horizontally.

6. The invention defined in claim 1, wherein said resilient load-carrying members comprise pairs of elongated coil springs, one end of each of said pair of springs being attached to said framework at locations horizontally spaced from each other, the other ends of said pair of springs having a common fastening adjacent to each other, and said support means includes a vertically disposed member for each of said pairs of coil springs, said fastening for the other ends of the spring being attached to said vertically disposed member.

7. The invention defined in claim 6, wherein at least a portion of the vertically disposed member is comprised of a threaded rod, and said fastening is attached in threaded engagement thereto for adjusting the force exerted by the coil springs.